United States Patent
Nakayama et al.

(10) Patent No.: US 8,108,129 B2
(45) Date of Patent: Jan. 31, 2012

(54) EXHAUST GAS RECIRCULATION APPARATUS FOR AN INTERNAL COMBUSTION ENGINE

(75) Inventors: Shigeki Nakayama, Susono (JP); Tomomi Onishi, Susono (JP); Akio Matsunaga, Miyoshi-cho (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 297 days.

(21) Appl. No.: 12/445,558

(22) PCT Filed: May 20, 2008

(86) PCT No.: PCT/JP2008/059610
§ 371 (c)(1),
(2), (4) Date: Apr. 14, 2009

(87) PCT Pub. No.: WO2009/141917
PCT Pub. Date: Nov. 26, 2009

(65) Prior Publication Data
US 2011/0054762 A1    Mar. 3, 2011

(51) Int. Cl.
| | |
|---|---|
| B60T 7/12 | (2006.01) |
| G05D 1/00 | (2006.01) |
| G06F 7/00 | (2006.01) |
| G06F 17/00 | (2006.01) |
| F02B 47/08 | (2006.01) |
| F02M 25/07 | (2006.01) |

(52) U.S. Cl. ............ 701/108; 123/568.2; 123/568.18
(58) Field of Classification Search ............ 123/568.12, 123/568.17, 568.18, 568.21, 704; 60/606.2
See application file for complete search history.

(56) References Cited

U.S. PATENT DOCUMENTS 4,942,860 A * 7/1990 Chujo et al. ............ 123/406.44
(Continued)

FOREIGN PATENT DOCUMENTS

| EP | 1 870 584 A2 | 12/2007 |
|---|---|---|
| JP | 01-155051 A | 6/1989 |
| JP | 05-018324 A | 1/1993 |
| JP | 5-071428 A | 3/1993 |
| JP | 10-141147 A | 5/1998 |

(Continued)

OTHER PUBLICATIONS

Japanese Office Action for corresponding Japanese Patent Application No. 2007-105682 dated Dec. 7, 2010.

*Primary Examiner* — Stephen K Cronin
*Assistant Examiner* — Sherman Manley
(74) *Attorney, Agent, or Firm* — Sughrue Mion, PLLC

(57) ABSTRACT

A technique is provided which, in an exhaust gas recirculation apparatus for an internal combustion engine, can calculate a low-pressure EGR rate and a high-pressure EGR rate in an accurate manner, and control the flow rates of both a low pressure EGR passage and a high pressure EGR passage in a closed-loop control manner, thereby to make the temperature of intake air and a supercharging pressure stable and to suppress the deterioration of exhaust emissions as well as the deterioration of power performance. The low pressure EGR rate, representative of the proportion of an amount of low pressure EGR gas to an amount of intake air sucked into the internal combustion engine, and the high pressure EGR rate, representative of the proportion of an amount of high pressure EGR gas to the amount of intake air, are calculated by using a $CO_2$ concentration in an intake passage at a location downstream of a connection portion of the low pressure EGR passage and upstream of a connection portion of the high pressure EGR passage, a $CO_2$ concentration in the intake passage at a location downstream the connection portion of the high pressure EGR passage, and a $CO_2$ concentration of an exhaust gas discharged from the internal combustion engine (S103). The low pressure EGR rate and the high pressure EGR rate to be calculated are controlled to individual target values, respectively (S104).

3 Claims, 4 Drawing Sheets

U.S. PATENT DOCUMENTS

| | | |
|---|---|---|
| 5,201,303 A | 4/1993 | Kojima |
| 6,000,385 A | 12/1999 | Fukuma |
| 6,470,682 B2 * | 10/2002 | Gray, Jr. .................. 60/605.2 |
| 6,948,475 B1 * | 9/2005 | Wong et al. ................ 123/299 |
| 7,261,098 B2 * | 8/2007 | Vigild et al. ............... 123/704 |
| 7,380,400 B2 * | 6/2008 | Barbe et al. ................ 60/605.2 |
| 2005/0274369 A1 | 12/2005 | Tonetti et al. |
| 2006/0213490 A1 * | 9/2006 | Vigild et al. ............... 123/704 |

FOREIGN PATENT DOCUMENTS

| | | |
|---|---|---|
| JP | 2004-150319 A | 5/2004 |
| JP | 2006-002761 A | 1/2006 |
| JP | 2006-322363 A | 11/2006 |
| JP | 2006-336547 A | 12/2006 |
| JP | 2007-321658 A | 12/2007 |
| JP | 2008-002347 A | 1/2008 |

* cited by examiner

EXHAUST GAS RECIRCULATION APPARATUS FOR AN INTERNAL COMBUSTION ENGINE

CROSS REFERENCE TO RELATED APPLICATIONS

This application is a National Stage of International Application No. PCT/JP2008/059610 filed May 20, 2008, the contents of all of which are incorporated herein by reference in their entirety.

TECHNICAL FIELD

The present invention relates to an exhaust gas recirculation apparatus for an internal combustion engine.

BACKGROUND ART

In Japanese patent application laid-open No. 2004-150319, there is disclosed a technique in which includes a low pressure EGR passage that serves to take in, as a low pressure EGR gas, a part of an exhaust gas from an exhaust passage at a downstream side of a turbine of a turbocharger and recirculate the low pressure EGR gas to an intake passage at an upstream side of a compressor of the turbocharger, and a high pressure EGR passage that serves to take in, as a high pressure EGR gas, a part of the exhaust gas from the exhaust passage at an upstream side of the turbine and recirculate the high pressure EGR gas to the intake passage at a downstream side of the compressor, wherein exhaust emissions are intended to be decreased by effectively using the low pressure EGR passage and the high pressure EGR passage in combination without impairing power performance as well as controllability and responsiveness for EGR control.

DISCLOSURE OF THE INVENTION

In the apparatus using the low pressure EGR passage and the high pressure EGR passage in combination as disclosed in the above-mentioned document, it is necessary to perform the flow control of one of the EGR passages in an open-loop control manner. Therefore, if the flow rate of the EGR gas in one of the EGR passages is varied due to an individual difference of the internal combustion engine, the intake temperature and the supercharging pressure would be changed, thus giving rise to a fear that the deterioration of exhaust emissions and/or the deterioration of power performance might be caused.

The present invention has been made in view of the above-mentioned problems, and has for its object to provide a technique which, in an exhaust gas recirculation apparatus for an internal combustion engine, can calculate a low pressure EGR rate and a high pressure EGR rate in an accurate manner, and control the flow rates of both a low pressure EGR passage and a high pressure EGR passage in a closed-loop control manner, thereby to make the temperature of intake air and a supercharging pressure stable and to suppress the deterioration of exhaust emissions as well as the deterioration of power performance.

In the present invention, the following construction is adopted. That is, the present invention resides in an exhaust gas recirculation apparatus for an internal combustion engine which is characterized by comprising:

a turbocharger that has a turbine arranged on an exhaust passage of said internal combustion engine and a compressor arranged on an intake passage of said internal combustion engine;

a low pressure EGR passage that serves to take in, as a low pressure EGR gas, a part of an exhaust gas from said exhaust passage at a location downstream of said turbine and recirculate the low pressure EGR gas to said intake passage at a location upstream of said compressor;

a high pressure EGR passage that serves to take in, as a high pressure EGR gas, a part of the exhaust gas from said exhaust passage at a location upstream of said turbine and recirculate the high pressure EGR gas to said intake passage at a location downstream of said compressor;

a calculation unit that calculates a low pressure EGR rate representative of the proportion of an amount of low pressure EGR gas to an amount of intake air sucked into said internal combustion engine and a high pressure EGR rate representative of the proportion of an amount of high pressure EGR gas to said amount of intake air by using a $CO_2$ concentration in said intake passage at a location downstream of a connection portion of said low pressure EGR passage and upstream of a connection portion of said high pressure EGR passage, a $CO_2$ concentration in said intake passage at a location downstream of the connection portion of said high pressure EGR passage, and a $CO_2$ concentration of the exhaust gas discharged from said internal combustion engine; and an EGR rate control unit that controls said low pressure EGR rate and said high pressure EGR rate calculated by said calculation unit to individual target values, respectively.

In the present invention, the low pressure EGR rate representative of the proportion of an amount of low pressure EGR gas to an amount of intake air sucked into the internal combustion engine and the high pressure EGR rate representative of the proportion of an amount of high pressure EGR gas to said amount of intake air are calculated by using the $CO_2$ concentration in the intake passage at a location downstream of the connection portion of the low pressure EGR passage and upstream of the connection portion of the high pressure EGR passage, the $CO_2$ concentration in the intake passage at a location downstream the connection portion of the high pressure EGR passage, and the $CO_2$ concentration of the exhaust gas discharged from the internal combustion engine.

According to this invention, it is possible to calculate both of the low pressure EGR rate and the high pressure EGR rate in an accurate manner. Therefore, based on the low pressure EGR rate and the high pressure EGR rate, it is possible to perform the flow control of both the low pressure EGR passage and the high pressure EGR passage in a closed-loop control manner. Accordingly, the intake air temperature and the supercharging pressure can be stabilized, whereby the deterioration of exhaust emissions can be suppressed, and the deterioration of power performance can be suppressed.

In addition, the amount of low pressure EGR gas can be calculated in an accurate manner when the low pressure EGR rate is obtained, so it is possible to calculate the flow rate of exhaust gas that passes through an exhaust gas purification device arranged on the exhaust passage in an accurate manner when using both the low pressure EGR passage and the high pressure EGR passage in combination, thus making it possible to improve the accuracy in the temperature control of the exhaust gas purification device.

Preferably, further provision may be made for:

a first $CO_2$ concentration detection unit that detects the $CO_2$ concentration in the intake passage at a location downstream of the connection portion of said low pressure EGR passage and upstream of the connection portion of said high pressure EGR passage;

a second $CO_2$ concentration detection unit that detects the $CO_2$ concentration in the intake passage at a location downstream of the connection portion of said high pressure EGR passage; and a third $CO_2$ concentration detection unit that detects the $CO_2$ concentration of the exhaust gas discharged from the internal combustion engine.

According to the present invention, the $CO_2$ concentrations at the respective portions can be detected in an accurate manner, and both of the low pressure EGR rate and the high pressure EGR rate can be calculated in an accurate manner by the use of the $CO_2$ concentrations at the respective portions.

Preferably, further provision may be made for:

a first $CO_2$ concentration detection unit that detects the $CO_2$ concentration in the intake passage at a location downstream of the connection portion of said low pressure EGR passage and upstream of the connection portion of said high pressure EGR passage;

a first $CO_2$ concentration calculation unit that calculates the $CO_2$ concentration in the intake passage at a location downstream of the connection portion of said high pressure EGR passage from an intake air pressure, a cylinder volume, cylinder capacity or volumetric displacement, a volumetric efficiency, and an intake air temperature in the intake passage downstream of the connection portion of said high pressure EGR passage, and from an amount of fresh air and an amount of injection fuel; and a second $CO_2$ concentration calculation unit that calculates the $CO_2$ concentration of the exhaust gas discharged from the internal combustion engine, from the amount of fresh air and the amount of injection fuel.

According to the present invention, the $CO_2$ concentrations at the respective portions can be derived in an accurate manner while making cost reduction by using only the single expensive $CO_2$ concentration detector, and both of the low pressure EGR rate and the high pressure EGR rate can be calculated in an accurate manner by the use of the $CO_2$ concentrations at the respective portions.

Preferably, further provision may be made for:

a bypass passage that returns, in the intake passage at a location downstream of the connection portion of said low pressure EGR passage and upstream of the connection portion of said high pressure EGR passage, the intake air in the intake passage at a location downstream of said compressor to the intake passage at a location upstream of said compressor;

a pressure regulating unit that regulates the pressure in said bypass passage at a downstream side thereof to a constant level; and a first $CO_2$ concentration detection unit that detects, in said bypass passage downstream of said pressure regulating unit, the $CO_2$ concentration in the intake passage at a location downstream of the connection portion of said low pressure EGR passage and upstream of the connection portion of said high pressure EGR passage.

According to the present invention, the $CO_2$ concentration of mixed gases after the fresh air and the low pressure EGR gas have been mixed with each other to a satisfactory extent to become the constant pressure is detected, so the mixed gases are uniformly mixed with each other to be at the constant pressure, as a result of which it is possible to reduce measurement errors at the time of detection, and to detect the $CO_2$ concentration of the mixed gases in an accurate manner.

According to the present invention, in the exhaust gas recirculation apparatus for an internal combustion engine, the low pressure EGR rate and the high pressure EGR rate can be calculated in an accurate manner, and the flow rates of both a low pressure EGR passage and a high pressure EGR passage can be controlled in a closed-loop control manner, whereby the intake air temperature and the supercharging pressure can be stabilized, thus making it possible to suppress the deterioration of exhaust emissions and the deterioration of power performance.

BEST MODE FOR CARRYING OUT THE INVENTION

Hereinafter, reference will be made to specific embodiments of the present invention.

First Embodiment

Figure 1:
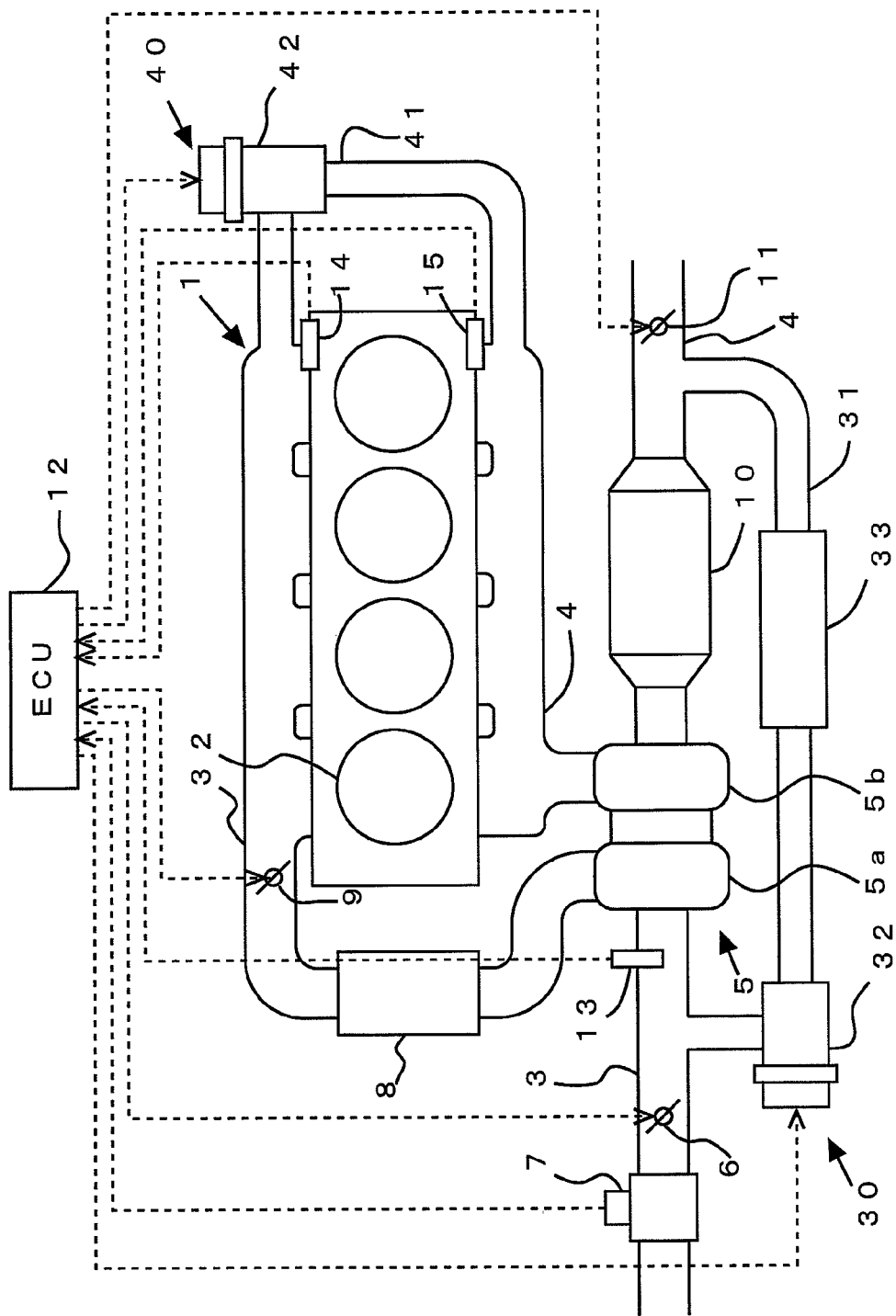
FIG. 1 is a view showing an internal combustion engine and its intake and exhaust systems according to a first embodiment of the present invention.

FIG. 1 shows the schematic construction of an internal combustion engine with its intake and exhaust systems to which an exhaust gas recirculation apparatus for an internal combustion engine according to an embodiment of the present invention is applied. The internal combustion engine 1 as shown in FIG. 1 is a water-cooled four-stroke cycle diesel engine having four cylinders 2. An intake passage 3 and an exhaust passage 4 are connected with the internal combustion engine 1.

A compressor housing 5a of a turbocharger 5, which is operated by the energy of an exhaust gas as a drive source, is arranged in an intermediate portion of the intake passage 3 connected with the internal combustion engine 1. Also, a first throttle valve 6, which serves to adjust the flow rate of intake air passing through the intake passage 3, is arranged on the intake passage 3 at a location upstream of the compressor housing 5a. The first throttle valve 6 is opened and closed by an electric actuator. An air flow meter 7 for outputting a signal corresponding to the flow rate of fresh intake air (hereinafter referred to as fresh air) passing through the intake passage 3 is arranged on the intake passage 3 at a location upstream of the first throttle valve 6. The amount of fresh air in the internal combustion engine 1 is measured by the air flow meter 7.

An intercooler 8 for performing heat exchange between intake air and outside air is arranged on the intake passage 3 at a location downstream of the compressor housing 5a. Also, a second throttle valve 9 for adjusting the flow rate of intake air passing through the intake passage 3 is arranged on the intake passage 3 at a location downstream of the intercooler 8. The second throttle valve 9 is opened and closed by means of an electric actuator.

On the other hand, a turbine housing 5b of the turbocharger 5 is arranged on an intermediate portion of the exhaust passage 4 connected with the internal combustion engine 1. In addition, an exhaust gas purification device 10 is arranged on the exhaust passage 4 at a downstream side of the turbine housing 5b.

The exhaust gas purification device 10 is constructed to have an oxidation catalyst, and a particulate filter (hereinafter simply referred to as a filter) that is arranged at the following stage (downstream side) of the oxidation catalyst. An occlusion reduction type NOx catalyst (hereinafter referred to simply as a NOx catalyst) is carried on the filter.

An exhaust gas throttle valve 11 for adjusting the flow rate of the exhaust gas passing through the exhaust passage 4 is arranged on the exhaust passage 4 at a location downstream of the exhaust gas purification device 10. The exhaust gas throttle valve 11 is opened and closed by means of an electric actuator.

In addition, a low pressure EGR device 30 for returning (recirculating) a part of the exhaust gas passing through the exhaust passage 4 to the intake passage 3 at low pressure is mounted on the internal combustion engine 1. The low pressure EGR device 30 is constructed to include a low pressure EGR passage 31, a low pressure EGR valve (LPL valve) 32, and a low pressure EGR cooler 33.

The low pressure EGR passage 31 serves to connect between a portion of the exhaust passage 4 which is downstream of the exhaust gas purification device 10 and upstream of the exhaust gas throttle valve 11, and a portion of the intake passage 3 which is upstream of the compressor housing 5a and downstream of the first throttle valve 6. The exhaust gas is sent to the internal combustion engine 1 through the low pressure EGR passage 31 at low pressure. And in this embodiment, the exhaust gas recirculating through the low pressure EGR passage 31 is called a low pressure EGR gas (LPL gas).

Moreover, the low pressure EGR valve 32 serves to control the amount of the low pressure EGR gas flowing through the low pressure EGR passage 31 by adjusting the passage cross sectional area of the low pressure EGR passage 31. Here, note that the adjustment of the amount of low pressure EGR gas can be performed by means of methods other than adjusting the degree of opening of the low pressure EGR valve 32. For example, by adjusting the degree of opening of the first throttle valve 6, a differential pressure between the upstream and downstream sides of the low pressure EGR passage 31 is changed, whereby the amount of the low pressure EGR gas can be adjusted.

Further, the low pressure EGR cooler 33 lowers the temperature of the low pressure EGR gas by performing heat exchange between the low pressure EGR gas passing through the low pressure EGR cooler 33 and the cooling water in the internal combustion engine 1.

On the other hand, a high pressure EGR device 40 for returning or recirculating a part of the exhaust gas passing through the exhaust passage 4 to the intake passage 3 at high pressure is mounted on the internal combustion engine 1. The high pressure EGR device 40 is constructed to include a high pressure EGR passage 41 and a high pressure EGR valve (HPL valve) 42.

The high pressure EGR passage 41 serves to connect between a portion of the exhaust passage 4 which is upstream of the turbine housing 5b and a portion of the intake passage 3 which is downstream of the compressor housing 5a. The exhaust gas is sent to the internal combustion engine 1 at high pressure through the high pressure EGR passage 41. And in this embodiment, the exhaust gas recirculating through the high pressure EGR passage 41 is called a high pressure EGR gas (HPL gas).

In addition, the high pressure EGR valve 42 serves to control the amount of the high pressure EGR gas flowing through the high pressure EGR passage 41 by adjusting the passage cross sectional area of the high pressure EGR passage 41. Here, note that the adjustment of the amount of high pressure EGR gas can be performed by means of methods other than adjusting the degree of opening of the high pressure EGR valve 42. For example, by adjusting the degree of opening of the second throttle valve 9, a differential pressure between the upstream and downstream sides of the high pressure EGR passage 41 is changed, whereby the amount of the high pressure EGR gas can be adjusted. In addition, in case where the turbocharger 5 is of a variable volume type, the amount of the high pressure EGR gas can be controlled by adjusting the degree of opening of a nozzle vane that changes the flow characteristic of the turbine.

An ECU 12 in the form of an electronic control unit for controlling the internal combustion engine 1 is provided in conjunction with the internal combustion engine 1 as constructed in the above-described manner. This ECU 12 serves to control the operating state of the internal combustion engine 1 in accordance with the operating condition of the internal combustion engine 1 and driver's requirements.

A variety of kinds of sensors such as the air flow meter 7, etc., are connected to the ECU 12 through electric wiring, so that the output signals of the various sensors are input to the ECU 12.

On the other hand, the individual actuators for the first throttle valve 6, the second throttle valve 9, the exhaust gas throttle valve 11, the low pressure EGR valve 32 and the high pressure EGR valve 42 are also connected to the ECU 12 through electrical wiring, so that these valves are controlled by means of the ECU 12.

By controlling the low pressure EGR valve 32 and the high pressure EGR valve 42, the low pressure EGR rate, which represents the proportion of the low pressure EGR gas to the intake air sucked to the internal combustion engine 1, and the high pressure EGR rate, which represents the proportion of the high pressure EGR gas to the intake sucked to the internal combustion engine 1, are adjusted.

Here, note that in the past, in apparatuses using a low pressure EGR passage and a high pressure EGR passage in combination, it is necessary to perform the flow control of one of the EGR passages in an open-loop control manner. Therefore, if the flow rate of the EGR gas in one of the EGR passages is varied due to an individual difference of the internal combustion engine, the intake temperature and the supercharging pressure would be changed, thus giving rise to a fear that the deterioration of exhaust emissions and/or the deterioration of power performance might be caused.

Accordingly, in this embodiment, the flow control of both the low pressure EGR passage 31 and the high pressure EGR passage 41 is carried out in a closed-loop control manner by calculating the low pressure EGR rate and the high pressure EGR rate in an accurate manner, and by controlling these low and high pressure EGR rates to the individual target values. In this manner, the intake air temperature and the supercharging pressure can be stabilized, whereby the deterioration of exhaust emissions can be suppressed, and the deterioration of power performance can be suppressed.

Moreover, the amount of low pressure EGR gas can be calculated in an accurate manner when the low pressure EGR rate is obtained, so it is possible to calculate the flow rate of the exhaust gas passing through the exhaust gas purification apparatus 10 arranged on the exhaust passage 4 in an accurate manner when using both the low pressure EGR passage 31 and the high pressure EGR passage 41 in combination, thereby making it possible to improve the accuracy in the temperature control of the exhaust gas purification device 10.

Here, the low pressure EGR rate and the high pressure EGR rate in this embodiment is calculated by using the $CO_2$ concentrations at three locations, i.e., the $CO_2$ concentration in the intake passage 3 at a location downstream of the connection portion of the low pressure EGR passage 31 and upstream of the connection portion of the high pressure EGR passage, the $CO_2$ concentration in the intake passage 3 at a downstream side of the connection portion of the high pressure EGR passage 41, and the $CO_2$ concentration of the exhaust gas discharged from the internal combustion engine 1.

Therefore, in this embodiment, the $CO_2$ concentrations at the three locations are detected by means of $O_2$ concentration sensors 13, 14, 15, respectively. That is, in this embodiment, there are provided the $O_2$ concentration sensor 13 for detecting the $CO_2$ concentration in the intake passage 3 at a location downstream of the connection portion of the low pressure EGR passage 31 and upstream of the connection portion of the high pressure EGR passage, the $O_2$ concentration sensor 14 for detecting the $CO_2$ concentration in the intake passage 3 at a location downstream of the connection portion of the high pressure EGR passage 41, and the $O_2$ concentration sensor 15 for detecting the $CO_2$ concentration of the exhaust gas discharged from the internal combustion engine 1. With such an arrangement, the $CO_2$ concentrations at the respective locations or portions can be detected in an accurate manner, and both of the low pressure EGR rate and the high pressure EGR rate can be calculated in an accurate manner by the use of the $CO_2$ concentrations at the respective locations or portions.

Here, note that the reason for detecting the $CO_2$ concentrations by means of the $O_2$ concentration sensors 13, 14, 15 is that an $O_2$ concentration and a $CO_2$ concentration are in a one-to-one relation and hence the $CO_2$ concentration can be replaced by the $O_2$ concentration. Therefore, the $O_2$ concentration sensors 13, 14, 15 in this embodiment correspond to the first through third $CO_2$ concentration detection units, respectively, of the present invention. Here, note that in this embodiment, the $O_2$ concentrations are a measured so as to detect the $CO_2$ concentrations, but besides this, the $CO_2$ concentrations may instead be detected by measuring $H_2O$ concentrations, $N_2$ concentrations.

In addition, by using the $CO_2$ concentrations at the above-mentioned three locations, and the amount of fresh air measured by the air flow meter 7, which is represented by Gn, the $CO_2$ concentration of the fresh air (atmosphere) is CO2N (CO2N is the $CO_2$ concentration of the atmosphere and hence is known); the $CO_2$ concentration of a mixed gas of the fresh air and the low pressure EGR gas detected by the $O_2$ concentration sensor 13 is CO2NL; the $CO_2$ concentration of a mixed gas of the fresh air, the low pressure EGR gas and the high pressure EGR gas detected by the $O_2$ concentration sensor 14 is CO2NLH; and the $CO_2$ concentration of the exhaust gas detected by the $O_2$ concentration sensor 15 is CO2EH.

Then, the amount of intake air Gcyl including all of the fresh air, the low pressure EGR gas and the high pressure EGR gas to be sucked to the internal combustion engine 1 can be denoted by the following equation:

$$Gcyl=((CO2EH-CO2N)/(CO2EH-CO2NLH))\cdot Gn \qquad \text{equation (1).}$$

The amount of low pressure EGR gas Glpl passing through the low pressure EGR passage 31 can be denoted by the following equation:

$$Glpl=((CO2NL-CO2N)/(CO2EH-CO2NL))\cdot Gn \qquad \text{equation (2).}$$

The amount of high pressure EGR gas Ghpl passing through the high pressure EGR passage 41 can be denoted by the following equation:

$$Ghpl=(((CO2EH-CO2N)/(CO2EH-CO2NLH))-\\((CO2NL-CO2N)/(CO2EH-CO2NL))-1)\cdot Gn \qquad \text{equation (3).}$$

On the other hand, the low pressure EGR rate representative of the proportion of the low pressure EGR gas to the intake air sucked to the internal combustion engine 1 is denoted as follows:

$$\text{the low pressure EGR rate}=Glpl/Gcyl \qquad \text{equation (4).}$$

The high pressure EGR rate representative of the proportion of the high pressure EGR gas to the intake sucked to the internal combustion engine 1 is denoted as follows:

$$\text{the high pressure EGR rate}=Ghpl/Gcyl \qquad \text{equation (5).}$$

Accordingly, the low pressure EGR rate can be calculated from equations (1), (2) and (4) above, and the high pressure EGR rate can be calculated from equations (1), (3) and (5) above.

By controlling the low pressure EGR valve 32 and the high pressure EGR valve 42, the low pressure EGR rate and the high pressure EGR rate to be calculated are controlled to the individual target values, respectively.

Here, note that the target values of the low pressure EGR rate and the high pressure EGR rate are values which are appropriately set in accordance with the operating state of the internal combustion engine 1 and surrounding environmental conditions.

Figure 2:
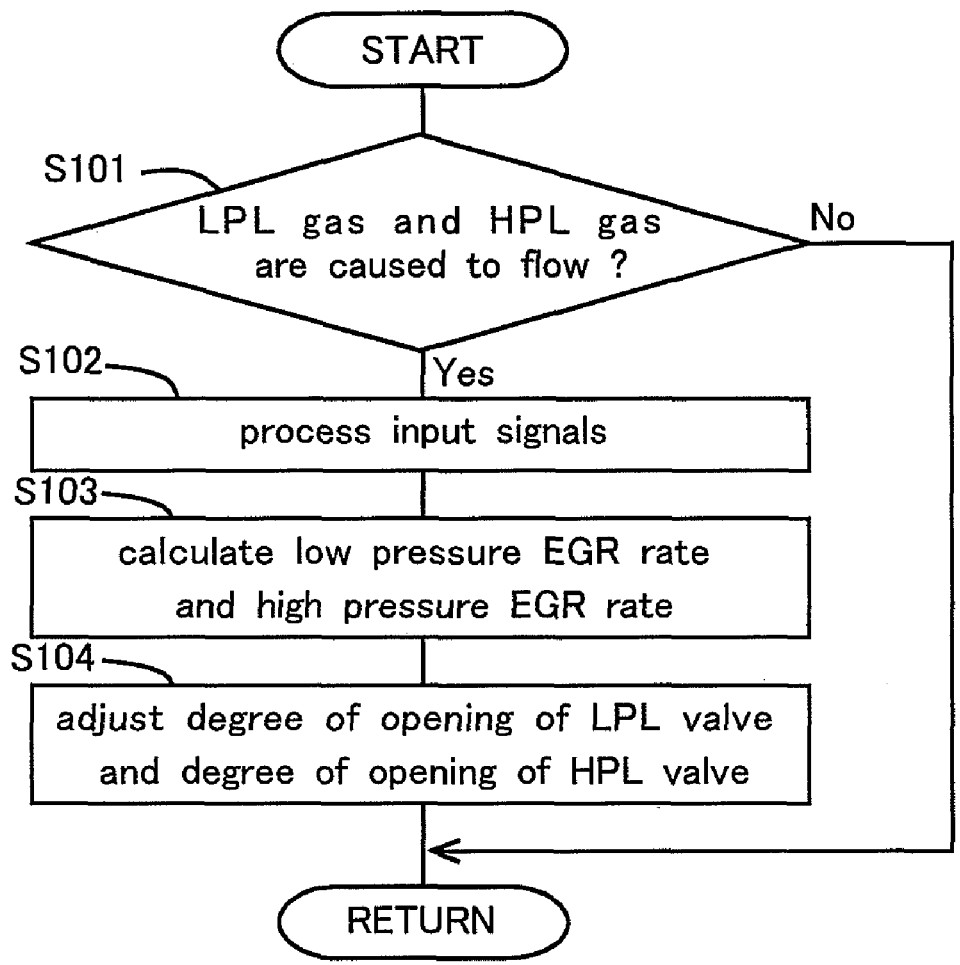
FIG. 2 is a flow chart illustrating a control routine for EGR rate control according to the first embodiment of the present invention.

Next, reference will be made to a routine for EGR rate control in this embodiment. FIG. 2 is a flow chart illustrating the routine for EGR rate control according to this embodiment. This routine is repeatedly carried out at every predetermined time interval.

In step S101, the ECU 12 determines whether the low pressure EGR gas and the high pressure EGR gas are caused to flow. A determination as to whether the low pressure EGR gas and the high pressure EGR gas are caused to flow is made by the opened/closed states of the low pressure EGR valve 32 and the high-pressure EGR valve 42, of which the degree of opening of the low pressure EGR valve 32 and the degree of opening of the high pressure EGR valve 42 are detected by means of unillustrated opening sensors, respectively.

In step S101, when the low pressure EGR valve 32 and/or the high pressure EGR valve 42 are/is in a closed state(s) with a determination made that the low pressure EGR gas and the high pressure EGR gas are not caused to pass through, the ECU 12 once terminates this routine. On the other hand, when the low pressure EGR valve 32 and the high pressure EGR valve 42 are in their opened states with a determination made that the low pressure EGR gas and the high pressure EGR gas are caused to pass through, the control flow proceeds to step S102.

In step S102, the ECU 11 processes the input signals from the air flow meter 7, the $O_2$ concentration sensors 13, 14, 15, etc.

In step S103 subsequent to step S102, the ECU 11 calculates the low pressure EGR rate and the high pressure EGR rate. As stated above, the low pressure EGR rate is calculated from the above-mentioned equations (1), (2) and (4), and the high pressure EGR rate is calculated from the above-mentioned equations (1), (3) and (5), by using the amount of fresh air Gn measured by the air flow meter 7 and the $CO_2$ concentration measured by the $O_2$ concentration sensors 13, 14, 15.

Here, note that the ECU 12 calculating the low pressure EGR rate and the high pressure EGR rate in this step corresponds to a calculation unit of the present invention.

In step S104 subsequent to step S103, the ECU 12 adjusts the degree of opening of the low pressure EGR valve 32 and the degree of opening of the high pressure EGR valve 42 so as to control the low pressure EGR rate and the high pressure EGR rate to be calculated in step S103 to the individual target values, respectively.

That is, the degree of opening of the low pressure EGR valve 32 is adjusted in accordance with the difference of the low pressure EGR rate and its target value, and at the same time, the degree of opening of the high pressure EGR valve 42 is also adjusted in accordance with the difference of the high pressure EGR rate and its target value.

Here, note that the amounts of adjustment for the degrees of opening of the low pressure EGR valve 32 and the high pressure EGR valve 42 can be acquired by applying the differences between the low pressure EGR rate and the high pressure EGR rate and their target values, respectively, to a map. The map representing the correlation between the degrees of the opening and the differences is obtained beforehand through experiments, etc., and is stored in the ECU 12.

In this step, the ECU 12, which controls the low pressure EGR rate and the high pressure EGR rate to the individual target values by adjusting the degree of opening of the low pressure EGR valve 32 and the degree of opening of the high pressure EGR valve 42, corresponds to an EGR rate control unit of the present invention.

According to the EGR rate control as described above, the flow control of both the low pressure EGR passage and the high pressure EGR passage is carried out in a closed-loop control manner by calculating the low pressure EGR rate and the high pressure EGR rate in an accurate manner, and by controlling these low and high pressure EGR rates to the individual target values.

In this embodiment, the control of the low pressure EGR rate and the high pressure EGR rate has been performed only by adjusting the degree of opening of the low pressure EGR valve 32 and the degree of opening of the high pressure EGR valve 42. However, the present invention is not limited to this, and the low pressure EGR rate and the high pressure EGR rate can be controlled by adjusting the degree of opening of the low pressure EGR valve 32 and the degree of opening of the high pressure EGR valve 42 in addition to adjusting the degree of opening of the first and second throttle valves 6, 9 and the degree of opening of the nozzle vane of the variable capacity type turbocharger.

Second Embodiment

In the above-mentioned embodiment, the $CO_2$ concentrations at the three locations or portions have been measured by the individual $O_2$ concentration sensors, respectively. However, the $O_2$ concentration sensors are expensive, and hence arranging the three sensors for one internal combustion engine results in an increase in cost. Accordingly, this embodiment is provided with only a single $CO_2$ concentration sensor 13 for detecting a $CO_2$ concentration in an intake passage at a location downstream of a connection portion of a low pressure EGR passage 31 and upstream of a connection portion of a high pressure EGR passage 41, and $CO_2$ concentrations at the other locations are obtained by arithmetic calculation. The construction other than the above is similar to the above-mentioned embodiment, so overlapping explanations are omitted.

Figure 3:
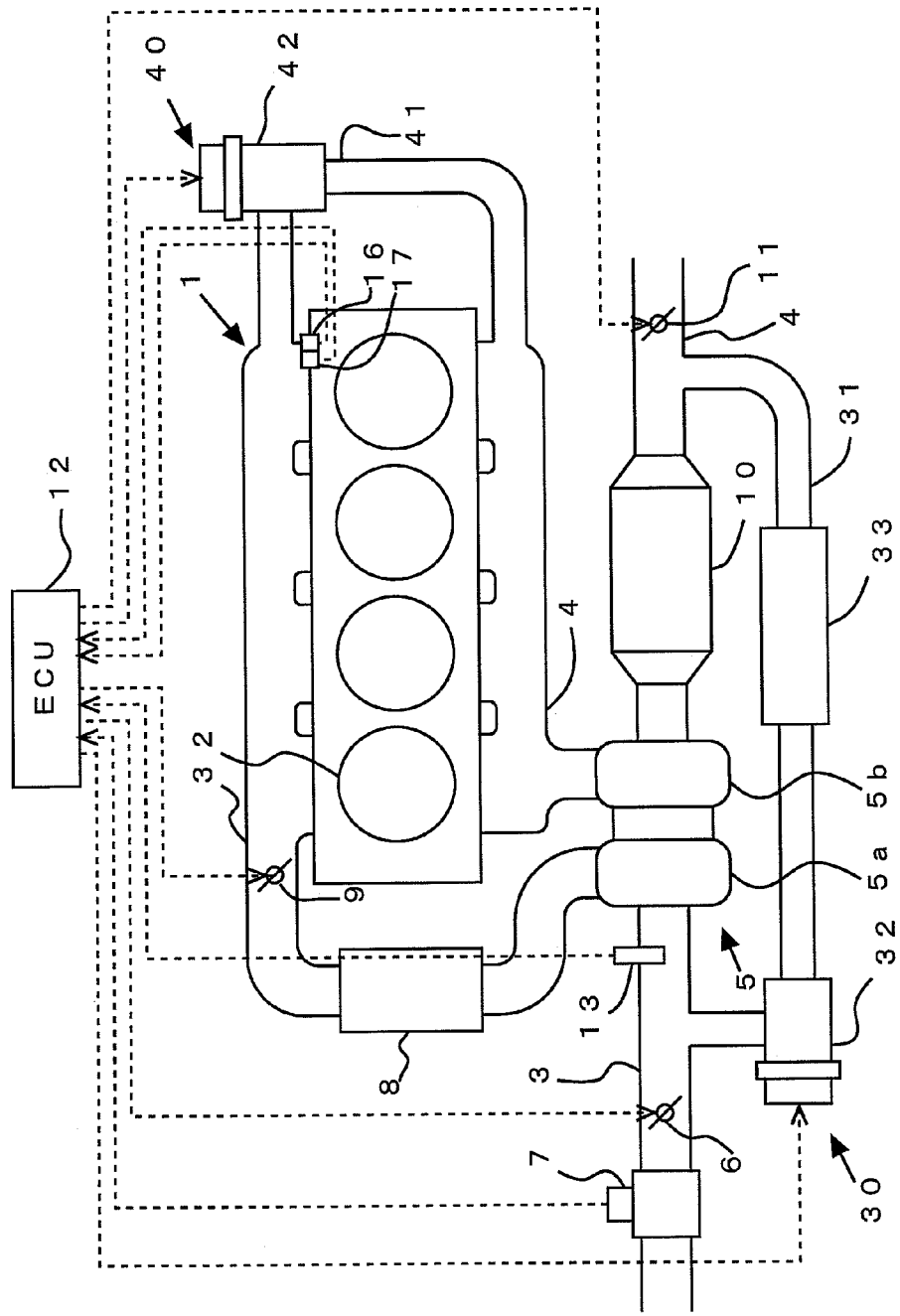
FIG. 3 is a view showing an internal combustion engine and its intake and exhaust systems according to a second embodiment of the present invention.

FIG. 3 shows the schematic construction of an internal combustion engine with an intake system and an exhaust system to which an exhaust gas recirculation apparatus for an internal combustion engine according to this embodiment of the present invention is applied. An intake pressure sensor 16 for detecting the intake pressure in the intake passage 3 at a downstream side of the connection portion of the high pressure EGR passage 41 is arranged on the intake passage 3 at a downstream side of the connection portion of the high pressure EGR passage 41. Also, similarly, an intake air temperature sensor 17 for detecting an intake air temperature in the intake passage 3 at a downstream side of the connection portion of the high pressure EGR passage 41 is arranged on the intake passage 3 at a downstream side of the connection portion of the high pressure EGR passage 41.

Moreover, in this embodiment, the flow control of both the low pressure EGR passage and the high pressure EGR passage is carried out in a closed-loop control manner by calculating the low pressure EGR rate and the high pressure EGR rate in an accurate manner, and by controlling these low and high pressure EGR rates to the individual target values. In this manner, the intake air temperature and the supercharging pressure can be stabilized, whereby the deterioration of exhaust emissions can be suppressed, and the deterioration of power performance can be suppressed.

Moreover, the amount of low pressure EGR gas can be calculated in an accurate manner when the low pressure EGR rate is obtained, so it is possible to calculate the flow rate of the exhaust gas passing through the exhaust gas purification apparatus 10 arranged on the exhaust passage 4 in an accurate manner when using both the low pressure EGR passage 31 and the high pressure EGR passage 41 in combination, thereby making it possible to improve the accuracy in the temperature control of the exhaust gas purification device 10.

Here, the low pressure EGR rate and the high pressure EGR rate in this embodiment is calculated by using the $CO_2$ concentrations at three locations, i.e., the $CO_2$ concentration in the intake passage 3 at a location downstream of the connection portion of the low pressure EGR passage 31 and upstream of the connection portion of the high pressure EGR passage, the $CO_2$ concentration in the intake passage 3 at a downstream side of the connection portion of the high pressure EGR passage 41, and the $CO_2$ concentration of the exhaust gas discharged from the internal combustion engine 1.

In this embodiment, the $CO_2$ concentration at one of the above-mentioned three locations is detected by the $O_2$ concentration sensor 13, and the $CO_2$ concentrations at the other two locations are obtained by arithmetic calculation. That is, this embodiment is provided with the $O_2$ concentration sensor 13 for detecting the $CO_2$ concentration in the intake passage 3 at the location downstream of the connection portion of the low pressure EGR passage 31 and upstream of the connection portion of the high pressure EGR passage 41. Here, note that the $O_2$ concentration sensor 13 in this embodiment corresponds to a first $CO_2$ concentration detection unit of the present invention. In addition, the $CO_2$ concentration in the intake passage 3 at the downstream side of the connection portion of the high pressure EGR passage 41 and the $CO_2$ concentration of the exhaust gas discharged from the internal combustion engine 1 are calculated by arithmetic calculation.

Here, the $CO_2$ concentration CO2NLH of a mixed gas of the fresh air, the low pressure EGR gas and the high pressure EGR gas, which is the $CO_2$ concentration in the intake passage 3 at the downstream side of the connection portion of the high pressure EGR passage 41, can be denoted as follows:

$$CO2NLH = ((Gcyl - Gn) \cdot CO2EH)/Gcyl \quad \text{equation (6)}.$$

The amount of intake air Gcyl used in equation (6) above is denoted as follows:

$$Gcyl = (Pim \cdot Vcyl \cdot \eta v)/(R \cdot Tim) \quad \text{equation (7)},$$

where Pim is the intake pressure (measure by the intake pressure sensor 16),

Vcyl is the cylinder volume, cylinder capacity or volumetric displacement, $\eta v$ is the volumetric efficiency, R is the gas constant, and Tim is the intake air temperature (measured by the intake air temperature sensor 17).

On the other hand, the $CO_2$ concentration CO2EH of the exhaust gas, which is the $CO_2$ concentration discharged from the internal combustion engine 1, is denoted as a function of (Gn, Q) by the following equation:

$$CO2EH=Func(Gn,Q) \qquad \text{equation (8),}$$

where Gn is the amount of fresh air (measured by the air flow meter 7), and

Q is the amount of injection fuel (the amount of fuel to be injected by the internal combustion engine 1, which is an amount instructed by the ECU 12).

Here, note that equation (8) above is a predetermined function which derives the $CO_2$ concentration CO2EH of the exhaust gas from the values of Gn, Q.

Accordingly, the $CO_2$ concentration in the intake passage 3 at a downstream side of the connection portion of the high pressure EGR passage 41 can be derived from equations (6), (7) and (8), and the concentration of $CO_2$ discharged from the internal combustion engine 1 can be derived from equation (8). Here, note that the ECU 12, which derives, from equations (6), (7) and (8) of this embodiment, the $CO_2$ concentration in the intake passage 3 at the downstream side of the connection portion of the high pressure EGR passage 41, corresponds to a first $CO_2$ concentration calculation unit of the present invention. In addition, the ECU 12, which derives the concentration of $CO_2$ discharged from the internal combustion engine 1 from equation (8) of this second embodiment, corresponds to a second $CO_2$ concentration calculation unit of the present invention.

According to this embodiment, the $CO_2$ concentrations at the respective three locations required to be obtained can be derived in an accurate manner while making cost reduction by using only the single expensive $CO_2$ concentration sensor, and both of the low pressure EGR rate and the high pressure EGR rate can be calculated in an accurate manner by the use of the $CO_2$ concentrations at the respective locations.

Third Embodiment

In the above-mentioned embodiments, the $O_2$ concentration sensor 13, which detects the $CO_2$ concentration in the intake passage 3 at a location downstream of the connection portion of the low pressure EGR passage 31 and upstream of the connection portion of the high pressure EGR passage 41, is arranged in the intake passage 3 at a location upstream of the compressor housing 5*a*. However, in the intake passage 3 at the upstream side of the compressor housing 5*a* in which the $O_2$ concentration sensor 13 is arranged, fresh air and a low pressure EGR gas are not mixed with each other to a satisfactory extent, and hence, it has been impossible to detect an accurate $CO_2$ concentration. Accordingly, in this third embodiment, a bypass passage 18 is provided which serves to return intake air in a first portion of the intake passage 3 at the downstream side of the compressor housing 5*a* to a second portion of the intake passage 3 at the upstream side of the compressor housing 5*a*, and the concentration of $CO_2$ in the bypass passage 18 is detected by the $O_2$ concentration sensor 13. In that case, a pressure regulating valve 19 for regulating the pressure in the bypass passage 18 at a downstream side thereof to a constant level is arranged in the bypass passage 18 so that fresh air and the low pressure EGR gas flowing in the bypass passage 18 in the bypass passage 18 can be mixed with each other to a satisfactory extent to become a substantially constant pressure, thereby making it possible to decrease a measurement error of the $O_2$ concentration sensor 13. The construction of this third embodiment other than the above is similar to the above-mentioned embodiments, so overlapping explanations are omitted.

Figure 4:
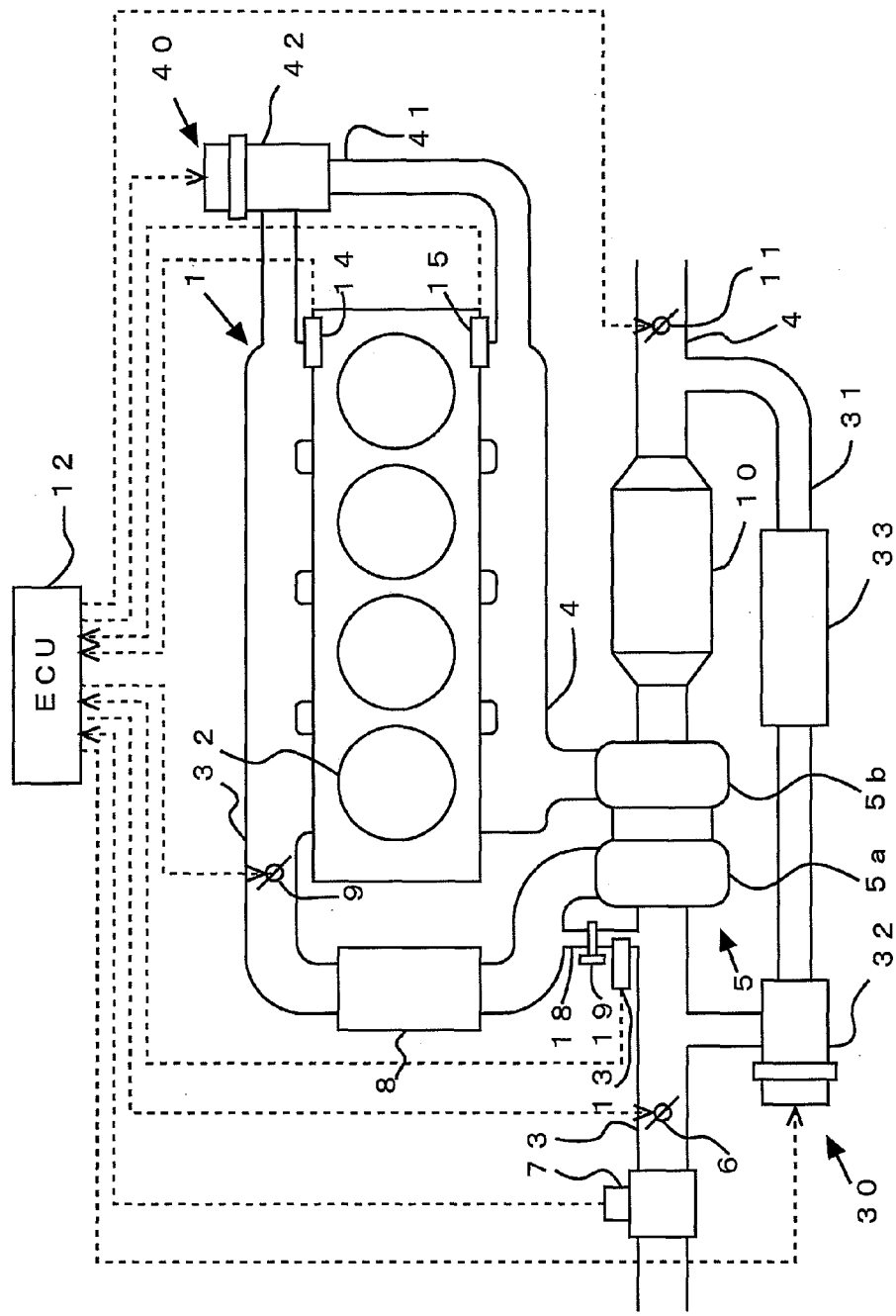
FIG. 4 is a view showing an internal combustion engine and its intake and exhaust systems according to a third embodiment of the present invention.

FIG. 4 shows the schematic construction of an internal combustion engine with an intake system and an exhaust system to which the exhaust gas recirculation apparatus for an internal combustion engine according to this embodiment of the present invention is applied. In the intake passage 3 at a location downstream of the connection portion of the low pressure EGR passage 31 and upstream of the connection portion of the high pressure EGR passage 41, there is arranged the bypass passage 18 which serves to return intake air in the first portion of the intake passage 3 at the downstream side of the compressor housing 5*a* to the second portion of the intake passage 3 at the upstream side of the compressor housing 5*a*.

In addition, the pressure regulating valve 19 for regulating the pressure in the bypass passage 18 at the downstream side thereof to the constant level is provided in the bypass passage 18. The pressure regulating valve 19 in this third embodiment corresponds to a pressure regulating unit of the present invention.

In addition, in the bypass passage 18 at the downstream side of the pressure regulating valve 19, there is provided the $O_2$ concentration sensor 13 for detecting the $CO_2$ concentration in the intake passage 3 at the location downstream of the connection portion of the low pressure EGR passage 31 and upstream of the connection portion of the high pressure EGR passage 41. Here, note that the $O_2$ concentration sensor 13 in this embodiment corresponds to the first $CO_2$ concentration detection unit of the present invention.

In this embodiment of the above-mentioned construction, the $CO_2$ concentration of mixed gases after the fresh air and the low pressure EGR gas have been mixed with each other to a satisfactory extent to become the constant pressure is detected, so the mixed gases are uniformly mixed with each other to be at the constant pressure, as a result of which measurement errors at the time of detection can be reduced, thereby making it possible to detect the $CO_2$ concentration of the mixed gases having the fresh air and the low pressure EGR gas mixed with each other in an accurate manner.

Therefore, similar to the above-mentioned embodiments, the flow control of both the low pressure EGR passage and the high pressure EGR passage is carried out in a closed-loop control manner by calculating both of the low pressure EGR rate and the high pressure EGR rate in an accurate manner, and by controlling these low and high pressure EGR rates to the individual target values. In this manner, the intake air temperature and the supercharging pressure can be stabilized, whereby the deterioration of exhaust emissions can be suppressed, and the deterioration of power performance can be suppressed.

Moreover, the amount of low pressure EGR gas can be calculated in an accurate manner when the low pressure EGR rate is obtained, so it is possible to calculate the flow rate of the exhaust gas passing through the exhaust gas purification apparatus 10 that is arranged on the exhaust passage 4 in an accurate manner when using both the low pressure EGR passage 31 and the high pressure EGR passage 41 in combination, thereby making it possible to improve the accuracy in the temperature control of the exhaust gas purification device 10.

An exhaust gas recirculation apparatus for an internal combustion engine according to the present invention is not limited to the above-mentioned embodiments, but various changes may be made therein within the range not departing from the spirit of the present invention.

INDUSTRIAL APPLICABILITY

According to the present invention, in an exhaust gas recirculation apparatus for an internal combustion engine, a low-pressure EGR rate and a high-pressure EGR rate can be calculated in an accurate manner, and the flow rates of both a low pressure EGR passage and a high pressure EGR passage can be controlled in a closed-loop control manner, whereby the intake air temperature and the supercharging pressure can be stabilized, thus making it possible to suppress the deterioration of exhaust emissions and the deterioration of power performance.

The invention claimed is:

1. An exhaust gas recirculation apparatus for an internal combustion engine characterized by comprising:
   a turbocharger that has a turbine arranged on an exhaust passage of said internal combustion engine and a compressor arranged on an intake passage of said internal combustion engine;
   a low pressure EGR passage that serves to take in, as a low pressure EGR gas, a part of an exhaust gas from said exhaust passage at a location downstream of said turbine and recirculate the low pressure EGR gas to said intake passage at a location upstream of said compressor;
   a high pressure EGR passage that serves to take in, as a high pressure EGR gas, a part of the exhaust gas from said exhaust passage at a location upstream of said turbine and recirculate the high pressure EGR gas to said intake passage at a location downstream of said compressor;
   a calculation unit that calculates a low pressure EGR rate representative of the proportion of an amount of low pressure EGR gas to an amount of intake air sucked into said internal combustion engine and a high pressure EGR rate representative of the proportion of an amount of high pressure EGR gas to said amount of intake air by using a $CO_2$ concentration in said intake passage at a location downstream of a connection portion of said low pressure EGR passage and upstream of a connection portion of said high pressure EGR passage, a $CO_2$ concentration in said intake passage at a location downstream of the connection portion of said high pressure EGR passage, and a $CO_2$ concentration of the exhaust gas discharged from said internal combustion engine; and
   an EGR rate control unit that controls said low pressure EGR rate and said high pressure EGR rate calculated by said calculation unit to individual target values, respectively;
   a bypass passage that returns, in the intake passage at a location downstream of the connection portion of said low pressure EGR passage and upstream of the connection portion of said high pressure EGR passage, the intake air in the intake passage at a location downstream of said compressor to the intake passage at a location upstream of said compressor;
   a pressure regulating unit that regulates the pressure in said bypass passage at a downstream side thereof to a constant level; and
   a first $CO_2$ concentration detection unit that detects, in said bypass passage downstream of said pressure regulating unit, the $CO_2$ concentration in the intake passage at a location downstream of the connection portion of said low pressure EGR passage and upstream of the connection portion of said high pressure EGR passage.

2. The exhaust gas recirculation apparatus for an internal combustion engine as set forth in claim 1, characterized by comprising:
   a first $CO_2$ concentration detection unit that detects the $CO_2$ concentration in the intake passage at a location downstream of the connection portion of said low pressure EGR passage and upstream of the connection portion of said high pressure EGR passage;
   a second $CO_2$ concentration detection unit that detects the $CO_2$ concentration in the intake passage at a location downstream of the connection portion of said high pressure EGR passage; and
   a third $CO_2$ concentration detection unit that detects the $CO_2$ concentration of the exhaust gas discharged from the internal combustion engine.

3. The exhaust gas recirculation apparatus for an internal combustion engine as set forth in claim 1, characterized by comprising:
   a first $CO_2$ concentration detection unit that detects the $CO_2$ concentration in the intake passage at a location downstream of the connection portion of said low pressure EGR passage and upstream of the connection portion of said high pressure EGR passage;
   a first $CO_2$ concentration calculation unit that calculates the $CO_2$ concentration in the intake passage at a location downstream of the connection portion of said high pressure EGR passage from an intake air pressure, a cylinder volume, a volumetric efficiency, and an intake air temperature in the intake passage downstream of the connection portion of said high pressure EGR passage, and from an amount of fresh air and an amount of injection fuel; and
   a second $CO_2$ concentration calculation unit that calculates the $CO_2$ concentration of the exhaust gas discharged from the internal combustion engine, from the amount of fresh air and the amount of injection fuel.

* * * * *